SAMUEL JOHNSTON & CHARLES H. JENNER.
Improvement in Harvesters.
No. 116,063.            Patented June 20, 1871.
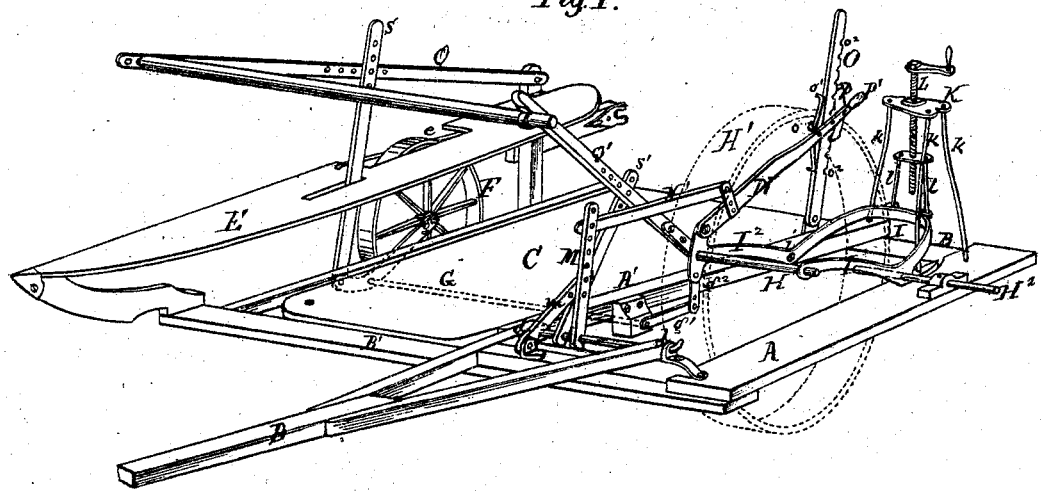
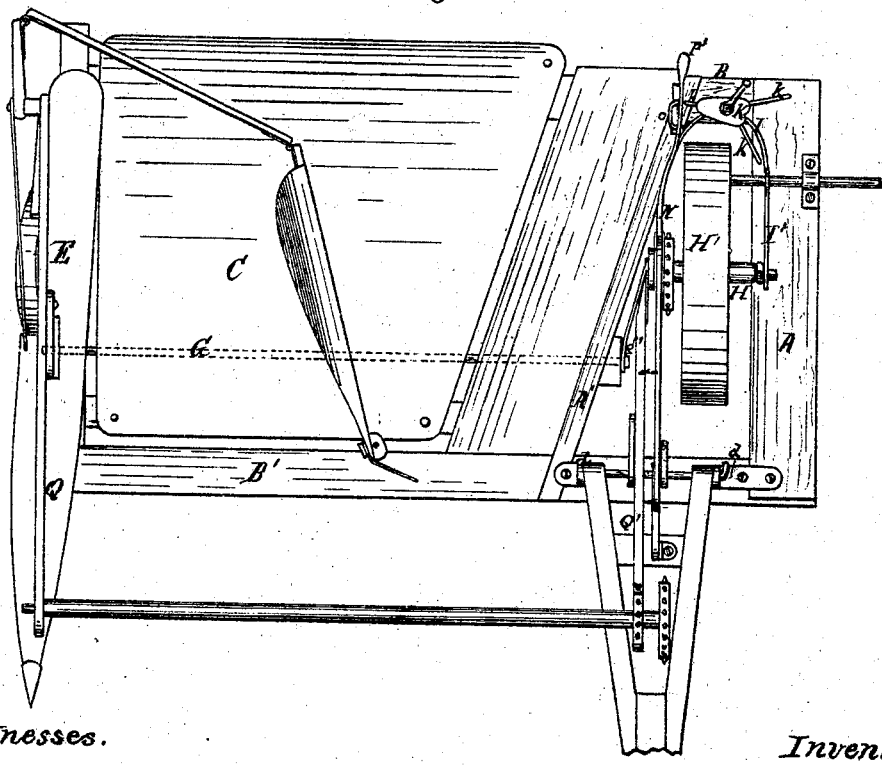

116,063

UNITED STATES PATENT OFFICE.

SAMUEL JOHNSTON AND CHARLES H. JENNER, OF BROCKPORT, NEW YORK; SAID JENNER ASSIGNS HIS RIGHT TO SAID JOHNSTON; SAID JOHNSTON ASSIGNOR TO JAMES S. THAYER, OF NEW YORK CITY.

IMPROVEMENT IN HARVESTERS.

Specification forming part of Letters Patent No. 116,063, dated June 20, 1871.

*To all whom it may concern:*

Be it known that we, SAMUEL JOHNSTON and CHARLES H. JENNER, both of Brockport, county of Monroe, State of New York, have invented certain new and useful Improvements in Harvesting-Machines, of which the following is a full, clear, and exact description, reference being had to the accompanying drawing making part of this specification, in which—

Figure 1 is a perspective view of so much of a harvesting-machine as is necessary to illustrate the improvement, and Fig. 2 is a plan view.

Similar letters of reference denote corresponding parts in both figures.

The first part of the invention relates to a novel construction of the devices employed for adjusting the height of the cutting apparatus and grain-platform of a one-wheeled harvester in such manner that the platform may be lifted bodily without disturbing the relation of the driving mechanism. The second part of the invention relates to the construction of the devices for rocking or tilting the grain-platform upon the driving and carrying or grain-wheels as a center, in order to maintain said platform at the desired inclination relative to the surface of the ground over which the machine is passing, and to adapt it to the kind and position of the grain being cut. The third part of the invention consists in a novel construction of the parts which support the reel, the object being not only to enable the operator to adjust at will the height of the reel from the cutting apparatus when the machine is at rest, but to provide means whereby, when the platform is raised or lowered, the height of the reel relative to the cutting apparatus and platform shall be varied automatically; and this part of the invention further consists in so constructing these reel-supporting devices that this variation in the distance between the reel and the cutters, as the platform is raised or lowered, may be regulated as the kind and condition of the crop shall indicate.

In the accompanying drawing the devices are shown under an arrangement which adapts them more particularly for application to machines which are provided with a square platform and a chain-rake; but it is evident that some, or all of them, may be applied to any other style of machine without any alteration of the principles upon which they operate.

A A' are longitudinal girts or side pieces, which, with the front and rear transverse sills B B', form the main frame of the machine. C is the grain-platform, swept by an ordinary chain-rake, which, as it forms no part of the invention and has no specific relation, is not shown in Fig. 1. D is the tongue, hinged to the main frame at $d$, substantially in the manner usual in this class of machines. The outer side of the grain-platform is provided with the ordinary divider-board E, supported at its front and rear ends, and recessed at $e$ for the reception of the grain-wheel F, which carries the outer end of the platform. Grain-wheel F is mounted upon one end, $g$, of a crank-arm, which is keyed or otherwise rigidly attached to rock-shaft G, which extends transversely across the grain-platform upon the under side, a little in front of the center, being mounted in suitable bearings, as shown in dotted lines. H is the main axle, upon which is mounted the drive-wheel, the wheel having been removed in order to show the other parts of the machine, its position being indicated, however, by the dotted lines $H^1$. $H^2$ is the secondary or pinion-shaft, upon which is mounted a pinion engaging with an internally-toothed rim attached to the drive-wheel. The bevel-wheel which drives the crank-shaft is also usually mounted upon shaft $H^2$. I $I^1$ $I^2$ is a U-shaped piece or yoke, made in substantially the form shown in the drawing. One arm, $I^1$, of the yoke is pivoted upon the secondary shaft $H^2$, and the other arm, $I^2$, is pivoted upon the main frame at $i$, the yoke occupying a horizontal position, and being free to vibrate vertically about the shaft $H^2$ as a center, for a purpose which will soon be explained. The arm $I^2$ is expanded at the end into a T-piece, to which various other parts of the devices are attached, as will be explained, and both arms $I^1$ $I^2$ are provided with bearings, in which are mounted main axle H. Thus it will be seen that drive-wheel $H^1$ can vibrate about the secondary shaft $H^2$, and the length of these arms is such that a pinion on the end of said shaft $H^2$ shall be in proper mesh with the toothed rim of the drive-wheel above referred to, and it is apparent that, under the described relation of parts, the desired vibration of arms $I^1$ $I^2$ and the drive-wheel can be effected while the wheels are in gear. $K$ $k$ $k$ $k$ is a tripod-standard, the legs of which are supported in the main frame. L is a screw working on a thread cut in the cap K of the tripod. $e$ is a bail or link connecting the screw L with the rear or closed end of the yoke. In practice we prefer to make the screw with a right-and-left-hand thread, so that, as it rises through the cap K, the link $l$ will also rise upon the screw, and vice versa; but any ordinary form of screw may be used, if desired. $g^1$ is a crank-arm on the inner end of rock-shaft G, and attached to the yoke by means of link $g^2$. M is a standard, supported in a vertical, or nearly vertical, position upon the pivot of the tongue by means of the diagonal brace $m$, which may be bolted through either one of a series of holes in the standard. Thus the standard may be held at any inclination. N is a lever, pivoted to the T at the end of arm $I^2$ of the yoke, and connected with standard M by pivoted link $N'$. O is a ratchet-standard pivoted upon the main frame, and connected with the rear end of lever N by a locking device, which will be more fully described hereafter.

The operation of the above-described devices is as follows: Supposing the parts to be in the position shown in the drawing, and we wish to raise the platform, we turn screw I, so as to raise link $l$, thereby raising the rear end of the yoke I $I^1$ $I^2$, and, as the open end of said yoke is supported by the drive-wheel, it follows that the main frame and inner end of the grain-platform are thereby elevated. As the rear end of crank-arm $g^1$ is prevented from rising by link $g^2$, while the rock-shaft G has been carried upward with the main frame, the rock-shaft has, of course, been rotated just as though it (the shaft) had remained stationary and the arm had been depressed. This rotation of the rock-shaft tends to depress the rear end of the crank-arm $g$ at the outer end of the shaft; but, as this end of the arm is supported upon the grain-wheel F, the effect is to raise the outer end of the platform; and it is evident that, if crank-arm $g$ is of the proper length, both ends of the platform will be raised equally. As the rear end of the lever N and the forward end of link $N'$ have been carried upward with the platform, while the inner ends of said lever and link have remained stationary, being attached to the end $I^2$ of the yoke, which is supported upon the main axle, the platform will be tilted, and the front side of the platform will be raised a little more than the rear edge will be; and that it may be desirable to further elevate or depress the cutter-bar without altering the relative position of the reel and other parts. To do this unlock the lever N from standard O and raise the lever. This movement serves to tilt the platform, rocking it upon the axles of the drive-wheel and grain-wheel, as will be readily understood by a reference to the drawing without further description; and it will be seen that, by shifting the front end of link $N'$ from one to another of the holes in standard M, the amount of tilting with a given throw of the lever may be regulated.

The locking devices employed for securing the lever N to standard O are as follows: $o$ is a loop or staple, the ends of which are secured in lever N, and through which the standard O passes. $o^1$ is a spring, arranged, as shown, with its ends pressing against the standard O in such manner as to draw one leg of staple $o$ into the notches $o^2$ on the rear edge of the standard, thus locking the lever firmly to the standard; while, in order to unlock them, it is only necessary to push the standard forward until the staple becomes disengaged from the notch in which it is resting.

In order to enable the driver to conveniently operate the lever with one hand we have invented the following devices: P is a sliding block, pivoted to an arm of socket $P'$, which incloses and slides freely upon the end of lever N. By preference we secure the socket and block to the lever by means of a set-screw, $p$, working through a slot in the lever. The operator places his hand upon socket $P'$ and presses block P against standard O with sufficient force to overcome the resistance of spring $o^1$, when the staple O is disengaged, and the lever is free to be raised or lowered, the block P being of such length and form as to slide readily over the notches. Q $Q'$ are reel-bearers, on which is mounted the reel-shaft R. Bearer Q is pivoted to a post, which supports the rear end of the divider-board E, bearer $Q'$ being pivoted to the main axle H, or to the arm $I^2$ of the yoke. $S'$ is a reel-bearer standard, pivoted upon the front end of the main frame. For convenience we pivot this standard upon the pivot to which the tongue is attached. S is another reel-bearer standard, having its lower end pivoted to a heel extension of crank-arm $g$. These standards are made adjustable in both directions relative to the reel-bearer—that is, vertically and longitudinally—by means of a series of holes in the standard and also in the bearers. From the above description it will be seen that, as the main frame and platform are raised, the outer end of reel-bearer $Q'$ is raised faster than the platform and cutter-bar are, because the inner end of said bearer is attached to main axle H, and has, therefore, remained stationary; and it will also be seen that the outer end of bearer Q has been raised faster than the cutter-bar and platform, because, although the rear end of said bearer has been raised with the platform, yet the standard S, which supports it, has moved faster than the platform on account of its being attached to the heel extension of crank-arm $g$, so that, by a proper proportioning and adjustment of parts, the desired parallelism may be maintained between the reel and cutter-bar, while, at the same time, the elevation of one relative to the other may be regulated at will.

Having now described the invention, what is claimed as new, and sought to be secured by Letters Patent, is—

1. In a one-wheeled harvesting-machine, the main drive-wheel mounted in a yoke or frame which vibrates about the secondary pinion-shaft as a center, in combination with a grain-wheel mounted on a crank-arm of a rock-shaft operated from the drive-wheel shaft, substantially as set forth.

2. The yoke I $I^1$ $I^2$, in combination with the main frame, drive-wheel, secondary shaft, and a lifting device applied to the yoke and main frame, substantially as set forth.

3. The combination of lever N, standard O, link N', and standard M with the tongue and main frame, substantially as set forth.

4. The reel-bearer Q', pivoted at the main axle, in combination with the standard S' mounted on the main frame, made adjustable relatively to the main axle, substantially as set forth.

5. The reel-bearer Q, pivoted to the platform, in combination with the standard S mounted upon the crank-arm of the rock-shaft, substantially as set forth.

6. The movable socket P' and sliding block P, in combination with the lever N, standard O, and spring $o^1$, constructed and operating substantially as set forth.

7. In combination with the main frame and vibrating yoke, the tripod K $k$ $k$ $k$, screw L, and link $l$, substantially as set forth.

SAML. JOHNSTON.
CHAS. H. JENNER.

Witnesses:
JOHN H. KINGSBURY,
FRANKLIN S. STEBBINS.